(12) United States Patent
Zibricky

(10) Patent No.: US 12,382,923 B2
(45) Date of Patent: Aug. 12, 2025

(54) PET SECURING DEVICE

(71) Applicant: Tiny Pup, LLC, New Lenox, IL (US)

(72) Inventor: Brian Zibricky, New Lenox, IL (US)

( * ) Notice: Subject to any disclaimer, the term of this patent is extended or adjusted under 35 U.S.C. 154(b) by 0 days.

(21) Appl. No.: 17/944,968

(22) Filed: Sep. 14, 2022

(65) Prior Publication Data
US 2024/0081274 A1    Mar. 14, 2024

(51) Int. Cl.
*A01K 1/04*    (2006.01)

(52) U.S. Cl.
CPC ..................... *A01K 1/04* (2013.01)

(58) Field of Classification Search
CPC ........... A01K 1/04; A01K 3/00; A01K 27/004
See application file for complete search history.

(56) References Cited

U.S. PATENT DOCUMENTS

| | | | | |
|---|---|---|---|---|
| 4,856,726 A * | 8/1989 | Kang | ................... | G01B 3/1005 |
| | | | | 242/384.7 |
| 4,961,544 A * | 10/1990 | Bidoia | ................. | A43C 11/165 |
| | | | | 242/395 |
| 6,536,376 B2 * | 3/2003 | Brown | ..................... | A01K 1/04 |
| | | | | 119/28.5 |
| 6,578,528 B1 * | 6/2003 | Brown | ..................... | A01K 1/04 |
| | | | | 119/769 |
| 6,695,101 B1 * | 2/2004 | Wang | .................... | A01K 27/004 |
| | | | | 188/65.1 |
| 2005/0011471 A1 * | 1/2005 | Laird | ....................... | A01K 1/04 |
| | | | | 119/789 |
| 2007/0215064 A1 * | 9/2007 | Petersen | .................. | A01K 1/04 |
| | | | | 119/786 |
| 2008/0257278 A1 * | 10/2008 | Simpson | .................. | A01K 1/04 |
| | | | | 119/781 |
| 2011/0120389 A1 * | 5/2011 | Yackley | ............... | A01K 27/004 |
| | | | | 119/796 |
| 2012/0137978 A1 * | 6/2012 | McBounds | .......... | A01K 27/004 |
| | | | | 119/796 |
| 2013/0008392 A1 * | 1/2013 | Holmstrom | .......... | A01K 27/004 |
| | | | | 119/796 |
| 2019/0208743 A1 * | 7/2019 | Daerr | ....................... | A01K 1/04 |
| 2020/0205380 A1 * | 7/2020 | Chung | .................. | B65H 75/486 |
| 2021/0307288 A1 * | 10/2021 | Reynolds | ............. | A01K 27/003 |
| 2022/0030826 A1 * | 2/2022 | Wilson | ..................... | A01K 3/00 |
| 2022/0272940 A1 * | 9/2022 | Chefetz | ................ | A01K 27/004 |

* cited by examiner

*Primary Examiner* — Morgan T Jordan
*Assistant Examiner* — Shada Mohamed Alghailani
(74) *Attorney, Agent, or Firm* — Camille A. Wilson; Wilson Dutra, PLLC

(57) ABSTRACT

The present disclosure provides for a pet securing device. The pet securing device may comprise one or more anchors. The anchor may comprise at least one cable. The anchor may comprise at least one attachment mechanism. The anchor may comprise a housing. The anchor may comprise at least one spindle. The cable may interface with at least one locking mechanism. The pet securing device may comprise at least one handle. The pet securing device may comprise one or more weights. When the pet securing device comprises a handle, the handle may be used to adjust the amount of weight attached to the pet securing device. The weights may attach to the pet securing device via one or more connecting mechanisms. The pet securing device may comprise at least one storage compartment within the main body of the pet securing device. The pet securing device may comprise one or more modular attachments. The pet securing device may interface with at least one external device.

13 Claims, 10 Drawing Sheets

PET SECURING DEVICE

BACKGROUND

For as long as humans have kept animals as pets, there has been a need to confine those pets. Whether the pet is intended to protect a certain area or the pet is being kept from entering a specific location, the need to restrict a pet's movement, even if only temporarily while the owner is away, has been a problem that has been pondered many times over the years.

One of the most common methods of securing a pet is to physically tie the pet to an object to restrict the movement of the pet to a predetermined proximity to the bound object. Some approaches to this method of securing a pet include both tie-outs and tie-downs. Tie-outs involve securing a pet to a specific point in the ground by means of a stake or heavy object and a rope or cable. A tie-down involves securing the pet to a large, immovable object, such as a wall.

While tie-outs and tie-downs are moderately successful at restricting a pet's movement, there are often issues with these methods of securing a pet. For example, the pet may slip out of a collar that is used to attach the pet to a stake, the snap on the collar may become accidentally opened, an entire stake-out unit may get pulled from the ground, or some mechanical element in the tie-out may fail, thereby turning the pet loose.

Many renditions of the tie-out stake have been developed to surmount these challenges, but unfortunately, most versions of the tie-out stake have their own problems or shortcomings. For. Example, some tie-out stakes can be pulled out by a strong pet lunging and pulling too hard on the attached chain or rope. Other tie-out stakes tend to unscrew from the ground during use or are not able to penetrate deep enough into the ground to remain stable when secured in soft soil or sand. Additionally, sometimes the chains used with tie-out stakes or anchors tend to tangle or get twisted and snub the attached pet up tight. It is also not uncommon for tie-out chains to get hung up around a tie-out anchor.

SUMMARY OF THE DISCLOSURE

What is needed is a pet securing device that is heavy enough to secure an attached pet in a desired area while being portable enough to be transported to other locations. A pet securing device that comprises at least one cable that retracts into and extends out of the device, thereby preventing tangling and binding of the cable against the pet, is also desired.

In some aspects, the present disclosure provides for such a pet securing device. In some embodiments, the pet securing device of the present disclosure may comprise one or more anchors. In some implementations, the anchor may comprise at least one at least partially flexible elongated member, such as a cable. In some aspects, the anchor may comprise at least one attachment mechanism configured at a distal end of the cable. In some embodiments, the anchor may comprise a housing.

In some implementations, the anchor may comprise at least one spindle that is at least partially enclosed within the housing. In some aspects, the cable and/or the spindle may interface with at least one locking mechanism. In some embodiments, the pet securing device may comprise a main body that comprises at least one handle. In some implementations, the pet securing device may comprise one or more weights or weighted elements. In some aspects, when the pet securing device comprises a main body with a handle, the handle may be configured to adjust the amount of weight attached to the pet securing device.

In some embodiments, one or more weights or weighted elements may be removably attached to the pet securing device via one or more connecting mechanisms. In some implementations, the pet securing device may comprise at least one storage compartment within the main body of the pet securing device. In some aspects, the pet securing device may comprise one or more modular attachments. In some embodiments, the pet securing device may interface with at least one external device.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Anchor: As used herein, refers to a portion of a pet securing device that maintains a connection between the pet and the pet securing device.

Cable: As used herein, refers to an at least partially flexible elongated member that extends between an attachment mechanism that is connected to a pet and a pet securing device. In some embodiments, the anchor may comprise at least one cable as a subcomponent.

Housing: As used herein, refers to a substantially hollow structure within a pet securing device that at least partially encloses one or more components of the anchor within the pet securing device. In some embodiments, the housing may interface with at least one locking mechanism. In some implementations, the housing may at least partially enclose at least one spindle therein in a configuration that allows the spindle to rotate about at least one axis in at least one direction. In some aspects, the housing may comprise at least one sidewall with at least one opening or aperture through which at least a portion of the anchor, such as the cable, may extend from the pet securing device to a pet.

Storage compartment: As used herein, refers to a substantially hollow cavity within a pet securing device that allows the pet securing device to store one or more objects. In some embodiments, the storage compartment may comprise two or more at least partially separated portions, wherein each of the portions may be configured to perform one or more different uses. For example, a portion of the storage compartment may comprise a removable, empty food or water dish. In some implementations, the storage compartment may comprise at least one lid or cover.

Figure 1A:
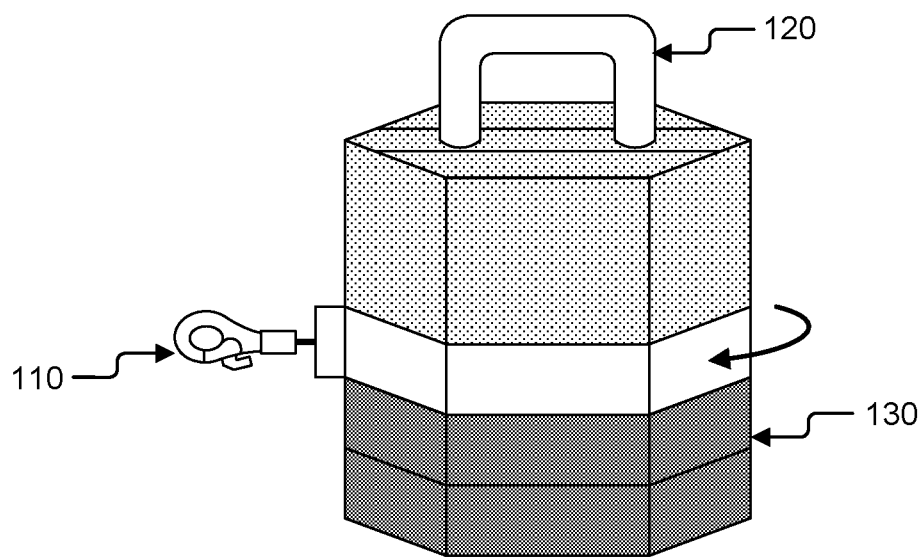
FIG. 1A illustrates an exemplary pet securing device, according to some embodiments of the present disclosure.
Figure 1B:
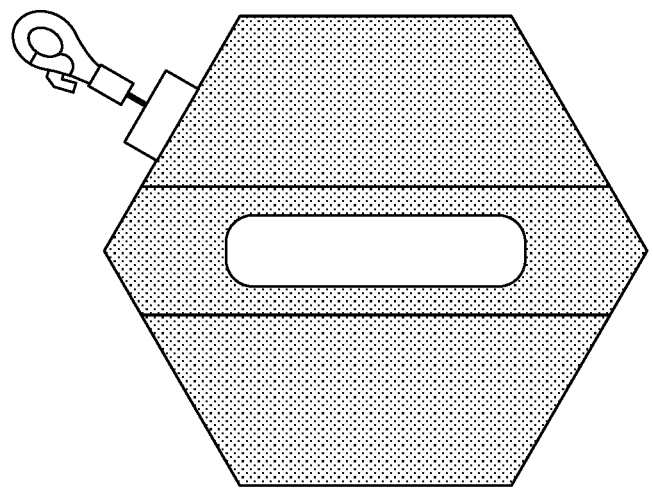
FIG. 1B illustrates a top view of an exemplary pet securing device, according to some embodiments of the present disclosure.

Referring now to FIGS. 1A-B, an exemplary pet securing device 100 is illustrated. In some embodiments, the pet securing device 100 may comprise a main body that comprises at least one handle 120. In some implementations, the pet securing device 100 may comprise one or more weights 130. In some aspects, the pet securing device 100 may comprise at least one anchor 110.

In some embodiments, the anchor 110 may be configured to removably secure a pet to the pet securing device 100. For example, a user may have a dog, and the user may not always be able to take time to supervise the dog for exercise or to make sure the pet stays within a certain area. The anchor 110 of pet securing device 100 may be used to maintain the dog in a secured position, so that the dog may only extend as far away from the pet securing device 100 as the anchor 110 allows it to.

The dog's proximity to the pet securing device 100 may be regulated by a portion of the anchor 110 that comprises an at least partially flexible elongated member, such as, by way of example and not limitation, a cable, chain, rope, or similar element that retractably extends from the pet securing device 100. In some implementations, the elongated member may be configured at part of the anchor 110.

In some implementations, the anchor 110 may comprise a housing that may be configured to at least partially rotate about at least one axis within the pet securing device 100 to facilitate the ability of an attached pet to move freely within a predefined radius around the pet securing device 100.

In some embodiments, the housing of the anchor 110 may be configured to rotate a full 360 degrees within the pet securing device 100. In some aspects, the housing of the anchor may rotate within the pet securing device 100 for an unlimited number of rotations. In some implementations, the rotation of the housing of the anchor 110 may be physically limited in an adjustable manner, such as by one or more detents, pins, tabs, catches, or similar protruding structures that may be movably adjusted to physically block the housing of the anchor 110 from rotating beyond a set range.

In some implementations, the anchor 110 may comprise at least one at least partially flexible elongated member that is extendable and retractable to allow the pet to travel a predetermined distance from the pet securing device 100 at its preference. For example, a user may secure a dog to the anchor 110 and set the rotation radius of the anchor 110 to 360 degrees and set the extension length of the anchor 110 to 30 feet. This may allow the dog to have a wide range of mobility without requiring any supervision from the human user.

As a further illustrative example, a user may not have the physical capabilities to supervise a dog while the dog exercises and plays. By attaching the dog to the anchor 110 of a pet securing device 100, the user may not need to put themselves at risk of injury or overexertion to let the dog get exercise.

An additional exemplary use may be a situation wherein a user may be preoccupied with responsibilities and is unable to supervise a dog. By attaching the dog to the anchor 110 of a pet securing device 100, the user may be able to perform other tasks without having to worry about watching the dog.

In some embodiments, the pet securing device 100 may comprise one or more removably securable weights 130 or similar weighted elements that may comprise a heaviness that is more than that of an attached pet to limit or eliminate the ability of the pet to move the pet securing device 100, either intentionally or unintentionally. In some implementations, the weights may comprise a circular shape. In some aspects, the weights 130 may comprise a shape with a plurality of corners and edges, such as triangles or hexagons, as non-limiting examples. In some embodiments, one or more of the weights 130 may comprise a shape that is different from the shape of at least one other weight 130. In some implementations, by way of example and not limitation, each weight 130 may comprise a material such as iron, steel, rubber, plastic, other metals or polymers, as well as any combination thereof.

In some implementations, weights 130 may be removed from or added to the pet securing device 100 to adjust the overall heaviness of the pet securing device 100 as needed or desired. The ability to remove weights 130 from the pet securing device 100 may facilitate the transportable nature of the pet securing device 100, thereby making it portable.

In some aspects, the inclusion of at least one handle 120 with the main body of the pet securing device 100 may further facilitate the transportation of the pet securing device 100. By way of example and not limitation, in some aspects, the handle 120 may be configured at an upper portion of the main body of the pet securing device 100, such as by being affixed to a top surface of the main body of the pet securing device 100.

As an illustrative example, if a puppy is attached to the anchor 110 of a pet securing device 100, then the puppy will be prevented from moving beyond a certain distance from the pet securing device 100 as determined by the resistance provided by the anchor 110. The weights 130 of the pet securing device 100 may allow the pet securing device 100 to stay in place while maintaining a secure position for the dog. The adjustable nature of the weights 130 may allow the pet securing device 100 to continue to accommodate the puppy as it grows, or allow the pet securing device 100 to be used to restrain dogs of different sizes.

To further illustrate this example, a German Shepard puppy that weighs 10 pounds may only need a pet securing device 100 to comprise weights 130 that have a heaviness of approximately 15 pounds to be maintained in a secured position. However, as that German Shepard puppy grows to be a 65-pound adult dog, more weights 130 will need to be added to the pet securing device 100 to allow the pet securing device 100 to securely restrain the pet.

By being able to add weights 130 to the pet securing device 100 as a dog grows, a human user may only need to possess one pet securing device 100 during the animal's lifetime. The ability to remove or add weights 130 to a pet securing device 100 may also be beneficial to a user with multiple dogs, such as a user who may use 15 pounds of weights 130 for a Chihuahua but may need to increase the weights 130 of the pet securing device 100 to use the pet securing device 100 effectively for a Collie or Bassett Hound. Examples of dog breeds are for illustrative purposes only and are not meant to be limiting.

The removability nature of the weights 130 may also make the portability of the pet securing device 100 easier. Along with the handle 120, by having the ability to remove one or more of the weights 130, a user may be able to transport the pet securing device 100 from an indoor closet to an outside yard without having to worry about carrying a very heavy single unit.

Figures 2A, 2B:
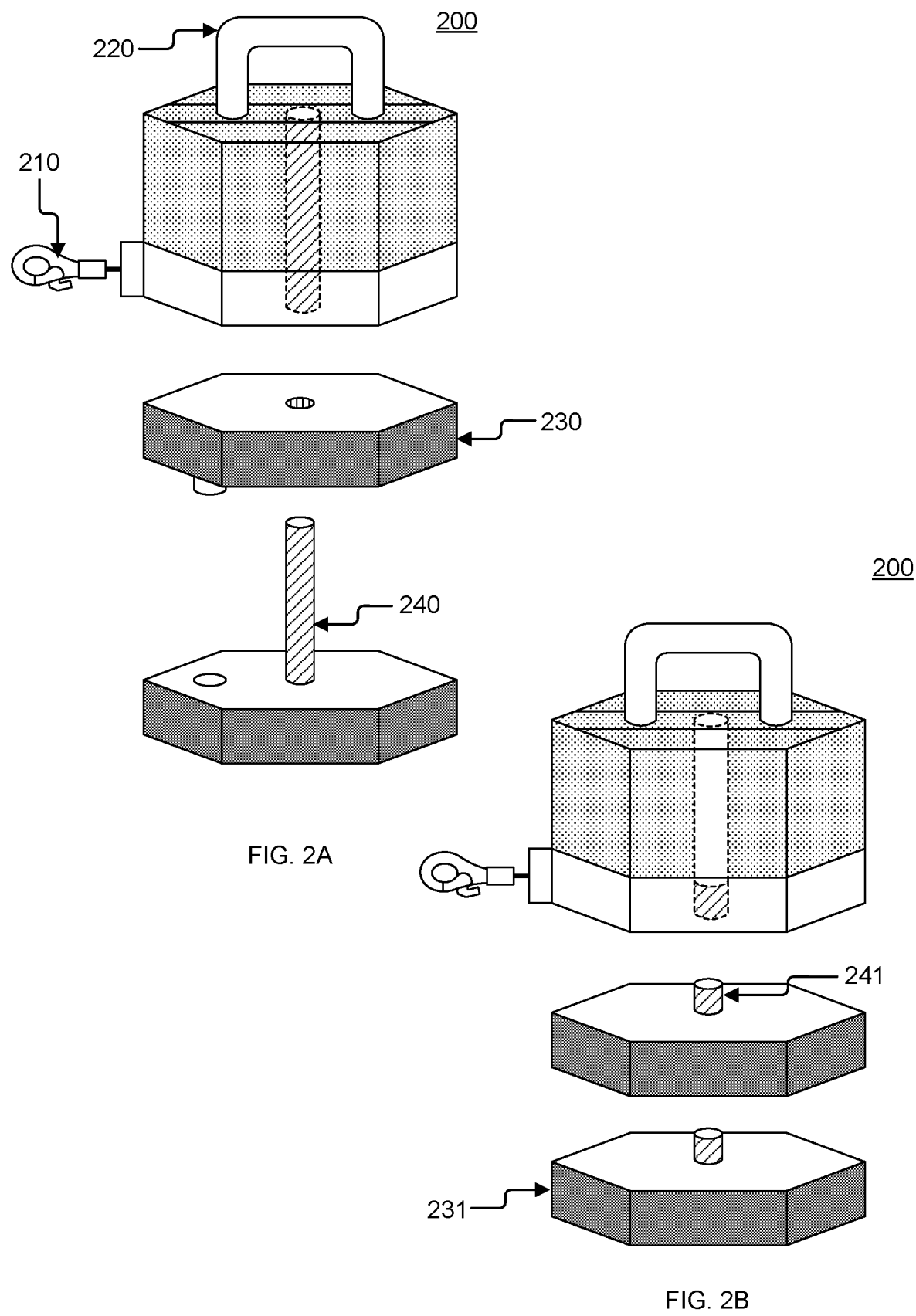
FIG. 2A illustrates an exemplary pet securing device comprising a connecting mechanism, according to some embodiments of the present disclosure.
FIG. 2B illustrates an exemplary pet securing device comprising a connecting mechanism, according to some embodiments of the present disclosure.

Referring now to FIGS. 2A-B, an exemplary pet securing device. 200 comprising a connecting mechanism 240, 241 is illustrated. In some embodiments, the main body of the pet securing device 200 may comprise at least one handle 220. In some implementations, the pet securing device 200 may comprise one or more weights 230, 231. In some aspects, the pet securing device 200 may comprise at least one anchor 210. In some embodiments, the pet securing device may comprise at least one connecting mechanism 240, 241.

In some embodiments, the connecting mechanism 240 may removably connect at least one weight 230 to the main body of the pet securing device 200. In some implementations, the connecting mechanism 240 may extend upwardly from a fixed position on a center portion of a bottom base weight, through a central substantially hollow opening or aperture of any additional optional weights 230, and be removably received by at least one internal recess within the main body of the pet securing device 200.

In some aspects, the internal recess within the main body of the pet securing device may comprise one or more threaded elements that correspond to one or more threaded elements on an outer surface of the connecting mechanism 240, thereby allowing the main body of the pet securing device 200 to be removably twisted or screwed onto an upper portion the connecting mechanism 240.

In some embodiments, both the internal recess of the main body and the outer surface of the connecting mechanism 240 may comprise substantially smooth surfaces, thereby allowing the main body to slidably receive the upper portion of the connecting mechanism 240 in a removable fashion.

In such embodiments, the main body of the pet securing device 200 may comprise one or more fastening elements, such as, by way of example and not limitation, one or more clips, clasps, latches, hooks, or pins that may removably secure the main body to one or more corresponding fastening elements integrated with one or more of the weights 230 and/or at least a portion of the connecting mechanism 240.

In some implementations, the weights 230 may be configured such that rotation of the weights 230 about the connecting mechanism 240 is limited or prevented. In some aspects, each weight 230 may be able to rotate freely about the connecting mechanism 240 for a limited or unlimited number of rotations As an illustrative example, each of the weights 230 may comprise at least one extrusion along the top surface of the weight 230, as well as at least one recess within the bottom surface of the weight 230 that corresponds to the geometry of the extrusion. These extrusions and recesses of adjacent weights 230 may be removably interconnected to allow the adjacent weights to fit together and maintain the rotational orientation of each weight 230 relative to the other weights 230.

Then, because the bottom weight 230 comprises the connecting mechanism 240, the rotational orientation of all of the attached weights 230 may become fixed as the connecting mechanism 240 secures the bottom weight to the main body of the pet securing device 200, thereby restricting rotational movement of the weights 230 about the connecting mechanism 240.

In some embodiments, the pet securing device 200 may comprise a plurality of connecting mechanisms 241, such that each of the weights 231 may comprise a separate connecting mechanism 241. As an illustrative example, the center of a circular weight 231 may comprise at least one connecting mechanism 241 in the form of an extruded external threaded element that extends upwardly from a top portion of the weight 231, as well as an internal threaded recess that extends from a bottom surface of the weight 231 into the center of the weight 231.

The corresponding internal threaded recesses and external threaded connecting mechanisms 241 may comprise substantially similar threaded structures, so that the external threaded connecting mechanism 241 of a first weight 231 may be removably received within the internal threaded recess of a second weight 231 adjacent to the first weight 231, thereby allowing consecutive adjacent weights 231 to be removably secured together in a vertical stacked orientation within the pet securing device 200.

In some aspects, the external connecting mechanisms 241 and internal recesses of weights 231 may not be threaded, but rather may comprise substantially smooth surfaces that allow the external connecting mechanisms 241 of weights 231 to be slidably received in a removable fashion within internal recesses of adjacent consecutive weights 231. In some implementations, the external connecting mechanism 241 of the uppermost weight 231 may be removably received by the internal recess of the main body of the pet securing device 200.

Figure 3:
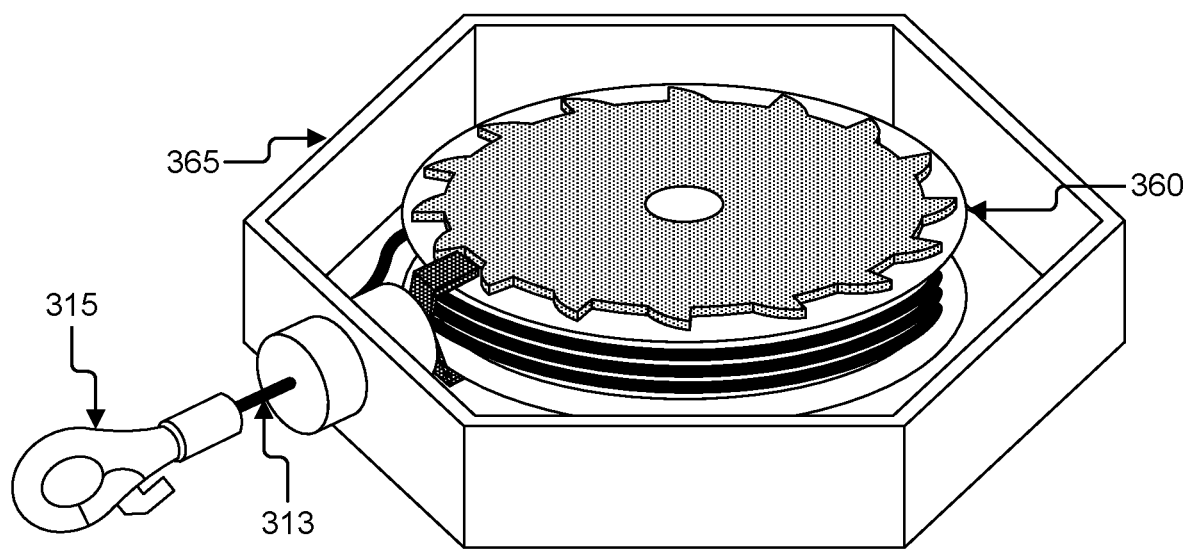
FIG. 3 illustrates a cutaway view of an anchor of an exemplary pet securing device, according to some embodiments of the present disclosure.

Referring now to FIG. 3, a cutaway view of an anchor 310 of an exemplary pet securing device 300 is illustrated. In some embodiments, the anchor 310 may comprise at least one attachment mechanism 315 configured to removably secure a pet to the pet securing device 300, such as, by way of example and not limitation, by removably attaching to a wearable item on the pet, such as a harness, collar, or similar element.

By way of example and not limitation, the attachment mechanism 315 may comprise one or more of: a hook, a clip, a clasp, and a clamp. In some implementations, the anchor 310 may comprise at least one at least partially flexible elongated member, such as cable 313. In some aspects, the anchor 310 may comprise at least one spindle 360. In some embodiments, the anchor may comprise a housing 365.

In some embodiments, the housing 365 may comprise a substantially hollow structure with at least one sidewall. In some implementations, the housing 365 may at least partially enclose the spindle 360. In some aspects, the housing 365 may comprise at least one opening or aperture in the at least one sidewall through which the exposed portion of the cable 313 may extend and retract as an enclosed portion of the cable 313 revolves in one or more directions around the spindle 360.

In some embodiments, the length of the exposed portion of the cable 313 may be adjusted as it extends and retracts through the opening in the housing 365. In some aspects, a distal end of the exposed portion of the cable 313 may be secured to the attachment mechanism 315. In some implementations, the length of the exposed portion of the cable 313 may be extended when subjected to an applied force, such as, by way of example and not limitation, a pulling force exerted by a pet or a human user. In some aspects, the housing 365 may be at least partially rotatable in at least one direction about at least one axis formed by at least one connecting mechanism of the pet securing device 300.

In some implementations, the anchor 310 may comprise a substantially hollow housing 365 that comprises at least one unidirectional spindle 360 therein, wherein rotation of the spindle 360 allows for the extension of the cable 313 and attachment mechanism 315 but locks the extended cable 313 in place by physically preventing rotation of the spindle 360 in a second direction that would facilitate retraction of the cable 313, such as, for example and not limitation, via a detent or catch, when the extending force is terminated.

In some aspects, at least one release mechanism may be engaged by a human user, wherein engagement of the release mechanism may physically release the spindle 360 from the locked state, such as by moving the detent or catch that is preventing rotation of the spindle 360 in the second direction, and thereby allow the spindle 360 to rotate in the direction that facilitates retraction of the cable 313.

Figure 4A:
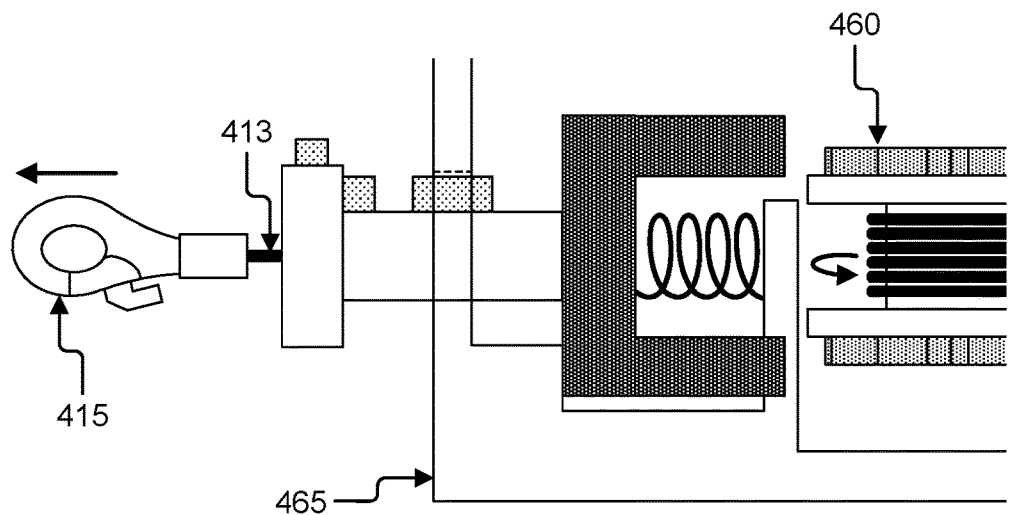
FIG. 4A illustrates a sectional view of an anchor of an exemplary pet securing device, according to some embodiments of the present disclosure.
Figure 4B:
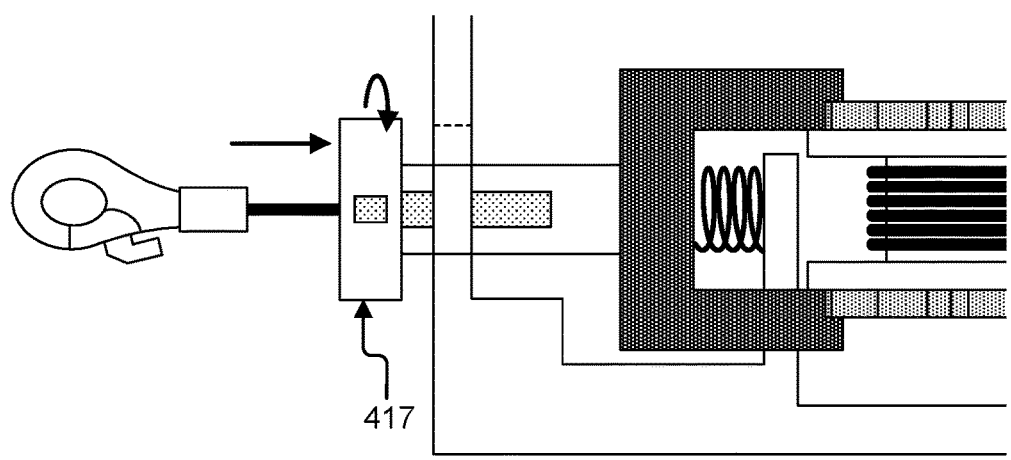
FIG. 4B illustrates a sectional view of an anchor of an exemplary pet securing device, according to some embodiments of the present disclosure.

Referring now to FIGS. 4A-B, sectional views of an anchor 410 of an exemplary pet securing device 400 are illustrated. In some embodiments, the anchor 410 may comprise at least one attachment mechanism 415. In some implementations, the anchor 410 may comprise at least one cable 413. In some aspects, the anchor 410 may comprise at least one spindle 460. In some embodiments, the anchor 410 may comprise a housing 465. In some implementations, the anchor may comprise at least one locking mechanism 417.

In some aspects, the housing 465 may comprise a substantially hollow internal cavity, wherein the locking mechanism 417 may be configured. In some embodiments, the locking mechanism 417 may comprise a spring-based component that is alterable between a locked state and an unlocked state, such as, for example and not limitation, via rotation of the locking mechanism 417. In some implementations, the unlocked state of the locking mechanism 417 may comprise a position wherein no part of the locking mechanism 417 physically engages the spindle or otherwise restricts movement of the cable 413 within the housing 465.

In some aspects, a user may physically manipulate or otherwise engage an exposed portion of the locking mechanism 417 that projects outwardly from the housing 465 through at least one opening or aperture in at least one sidewall of the housing 465 to rotate or otherwise move the locking mechanism 417 to the locked state.

In some embodiments, the locking mechanism 417 may have to be pushed inwardly toward the center of the pet securing device 400 as it is rotated, before it is rotated, or after it is rotated in order to be moved to and secured in the locked state. This pushing force may facilitate compression of the spring-based component of the locking mechanism 417 so that a locked state may be achieved wherein one or more detents, prongs, catches, or other projections may physically interact with one or more protrusions, teeth, tabs, recesses, grooves, or similar structures upon or within the spindle 460 and prevent the spindle 460 from rotating in at least one direction.

In some implementations, a user may rotate the exposed portion of the locking mechanism 417 in the opposite direction to free the detents from the protrusions or recesses of the spindle 460, after which the spring-based component of the locking mechanism 417 may push the locking mechanism 417 outwardly and away from the spindle 460 so that the spindle 460 may be free to rotate in a substantially unrestricted manner.

Figure 5A:
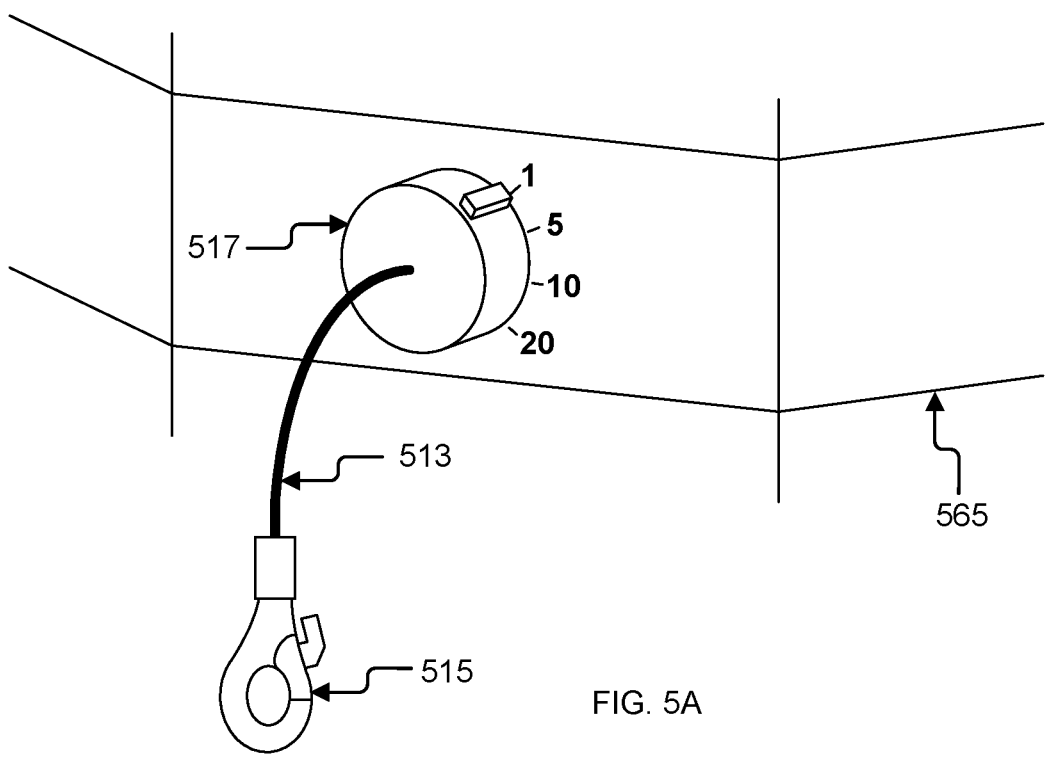
FIG. 5A illustrates a locking mechanism of an exemplary anchor, according to some embodiments of the present disclosure.
Figure 5B:
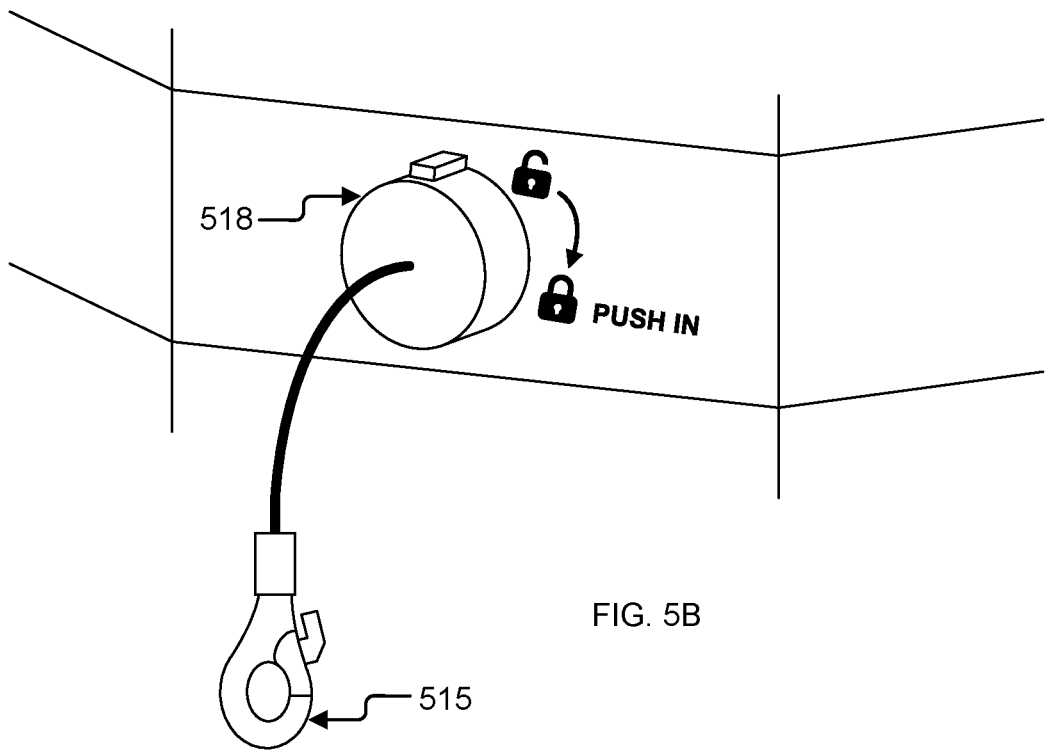
FIG. 5B illustrates a locking mechanism of an exemplary anchor, according to some embodiments of the present disclosure.

Referring now to FIGS. 5A-B, a locking mechanism 517, 518 of an exemplary anchor 510, 511 is illustrated. In some embodiments, the pet securing device may comprise at least one anchor 510, 511 that may comprise at least one attachment mechanism 515. In some implementations, the anchor 510, 511 may comprise at least one cable 513. In some embodiments, the anchor 510 may comprise a housing 565. In some implementations, the anchor 510 may comprise at least one locking mechanism 517.

In some embodiments, the cable 513 may be configured to interact with a spool or spindle 360 within the housing 565 that allows the cable 513 to extend and retract in a substantially unrestricted manner. In some aspects, the housing 565 may comprise at least one locking mechanism 517 that stops the extension of an exposed portion of the cable 513 extending through at least one opening or aperture in at least one sidewall of the housing 565 at one or more predetermined lengths.

In some implementations, the locked state of the locking mechanism 517 may comprise a plurality of locked positions to which the locking mechanism 517 may be rotated or otherwise moved. By rotating the locking mechanism 517 to different locked positions, the portion(s) of the locking mechanism 517 within the housing 565 may engage the spindle 560 in different configurations or at different positions such the spindle 560 is able to rotate in a direction that facilitates extension of the exposed portion of the cable 513 for only a limited distance before rotation of the spindle 560 is physically stopped by the locking mechanism 517 and further extension of the length of the exposed portion of the cable 513 is prohibited.

As an illustrative example, a human user may attach a dog to the anchor 510 via the attachment mechanism 515. The user may then set the predetermined extension length of the exposed portion of the cable 513 to 15 feet. When the dog eventually extends the cable 513 to 15 feet, the locking mechanism 517 may engage and prevent the exposed portion of the cable 513 from extending any further. This may allow the pet to roam freely within a circular region that comprises a radius of 15 feet as measured from the anchor 510.

In some embodiments, the housing 565 may comprise a locking mechanism 517 that may be engaged by a user on demand and may stop the extension of the exposed portion of the cable 513 on a continuous spectrum. In other words, the locking mechanism 517 may be engaged by a user to activate a locked state that secures the exposed portion of the cable 513 at a preferred length without having to set the locking mechanism 517 to lock the exposed portion of the cable at a predetermined extension length.

In addition to the locking techniques described previously, this on demand locking functionality performed by the locking mechanism 517 may be achieved, by way of example and not limitation, when an exposed portion of the locking mechanism 517 is engaged by a user and releases a spring-based clamping mechanism that firmly grasps the cable 513 to prevent the cable from moving.

By way of further example and not limitation, the clamping mechanism may be removed from the cable 513 when a user physically manipulates the exposed portion of the locking mechanism 517 to overcome the compression force of the spring-based clamping mechanism and place the clamping mechanism in a position that physically prevents the clamping mechanism from closing, such as by by positioning the clamping mechanism such that at least one detent, tab, catch, or similar protrusion physically blocks unintentional closure of the clamping mechanism.

For example, after securing a dog to the pet securing device 500 via the anchor 510, a user may decide to let the dog move freely within an open area, such as an outdoor park. Upon a determination that the dog is beginning to wander too far from the pet securing device 500, the user may engage the locking mechanism 517 to prevent the cable 513 from extending any further.

As a further example, a user may have a dog, and the user may want to let the dog roam in a yard unsupervised, but only at a certain length. The user may therefore attach the dog to the anchor 510 via the attachment mechanism 515. After attaching the dog, the user may then set the locking mechanism 517 to limit extension of the exposed portion of the cable 513 to a length of their choosing.

To further illustrate the example, the user's yard may include a garden 15 feet away from the anchor 510, so the user may decide to set the maximum extension length of the exposed portion of the cable 513 to 10 feet, so that the dog does not get into the garden. Alternatively, the user may manually set the maximum extension length of the exposed portion of the cable 513 by pulling the cable 513 out to a desired length and then engaging the locking mechanism 517, thereby setting a more precise distance from the pet securing device 500 for the dog to roam.

Figure 6:
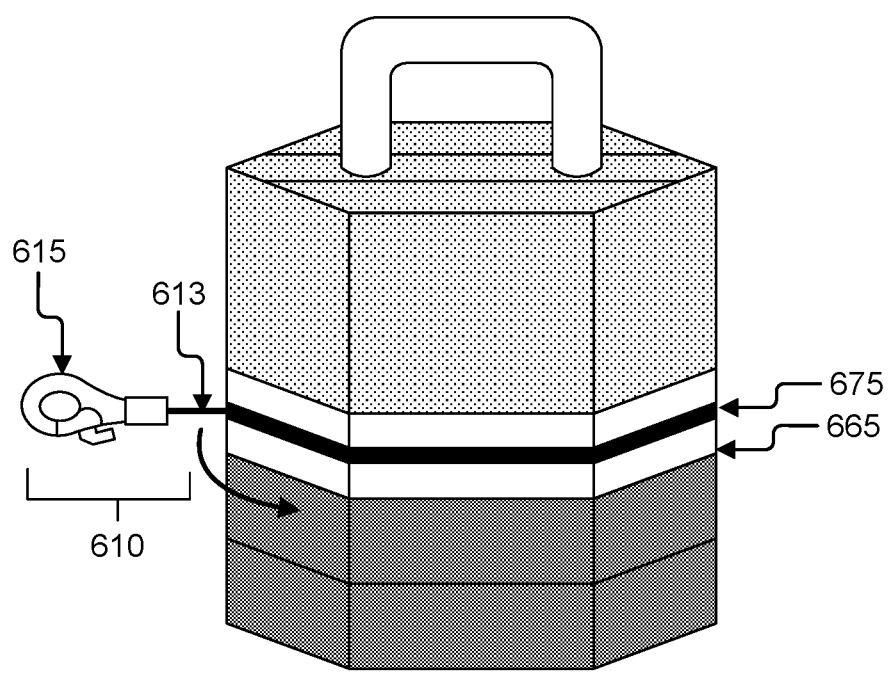
FIG. 6 illustrates an exemplary pet securing device, according to some embodiments of the present disclosure.

Referring now to FIG. 6, an exemplary pet securing device 600 is illustrated. In some embodiments, the pet securing device 600 may comprise at least one anchor 610 that may comprise at least one attachment mechanism 615. In some implementations, the anchor 610 may comprise at least one cable 613. In some embodiments, the anchor 610 may comprise a housing 665. In some implementations, the anchor 610 may comprise at least one locking mechanism.

In some implementations, the housing 665 may comprise one or more sidewalls that comprise at least one groove 675, slit, channel, or similar structure. The cable 613 may be configured to extend outwardly from the housing 665 through the groove 675 and may be slidable therein, thereby allowing a pet secured to the attachment mechanism 615 to move freely around the pet securing device 600 without requiring the housing 665 to rotate and without getting the cable 613 wrapped around the exterior portion of the pet securing device 600.

For example, a user may bring a dog to the beach and use the pet securing device 600 to let the dog run around without getting too far away and without requiring constant supervision from the user. The user may attach the dog to the pet securing device 600 using the attachment mechanism 615. The user may then use the locking mechanism to set a maximum extension length for the exposed portion of the cable 613 and the dog may be free to roam in a circular area with a radius defined by the maximum extension length of the cable 613 as the cable 613 slides within the groove 670 of the housing 665.

Figure 7:
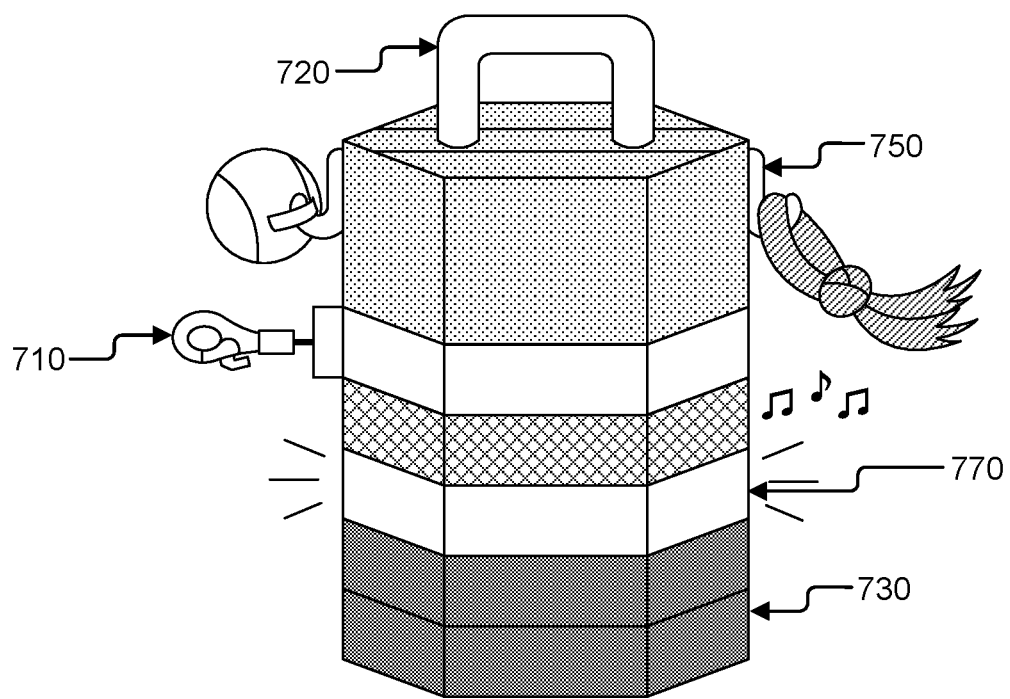
FIG. 7 illustrates an exemplary pet securing device comprising a plurality of modular attachments, according to some embodiments of the present disclosure.

Referring now to FIG. 7, an exemplary pet securing device 700 comprising a plurality of modular attachments 770 is illustrated. In some embodiments, the pet securing device 700 may comprise at least one handle 720. In some implementations, the pet securing device 700 may comprise at least one anchor 710. In some aspects, the pet securing device 700 may comprise one or more weights 730. In some embodiments, the pet securing device 700 may comprise one or more storage devices 750. In some implementations, the pet securing device 700 may comprise one or more modular attachments 770.

In some implementations, each storage device 750 may be configured to removably attach one or more supplemental objects to the pet securing device 700. In some aspects, the storage devices 750 may be secured, either permanently or temporarily, to an exterior portion of the pet securing device 700, such as, by way of example and not limitation, an exterior portion of the main body.

By way of further example and not limitation, each of the storage devices 750 may be secured via adhesion; welding; one or more hook-and-loop fasteners; one or more magnets; one or more pins, screws, nails, bolts, clasps, clamps, or similar fasteners; or any similar securing mechanisms. In some non-limiting exemplary embodiments, each storage device 750 may comprise at least one of: a hook, a clasp, a clamp, a peg, or any similar structure or mechanism capable of temporarily receiving a supplemental object.

Each of the storage devices 750 may allow one or more of a variety of supplemental objects to be easily transported with, stored upon, or otherwise used with the pet securing device 700. By way of example and not limitation, supplemental objects received by the storage devices may comprise objects or items that are necessary or desirable for pet care, including toys, medicines, collars, leashes, hygiene products, and the like.

As an illustrative example, a user may bring a dog to a friend's house and may secure the dog outside using the pet securing device 700. If the user is preoccupied and unable to entertain the dog, then the user or the dog may remove one or more supplemental objects in the form of toys from the storage devices 750 for the dog to interact with.

By way of example and not limitation, the supplemental objects may comprise a ball and a tugging rope. By having the ball and tugging rope to play with, the dog may be able to entertain itself for a period of time without having to be watched by the user. By having the toys and other supplemental objects attached to the storage devices 750, the user may have fewer individual items to carry when transporting the pet securing device 700.

In some implementations, the pet securing device 700 may comprise one or more various modular attachments 770. By way of example and not limitation, each modular attachment may comprise a substantially open and hollow center portion that allows each modular attachment 770 to be removably attached to the pet securing device 700 in a manner similar to how the weights are attached, such as by being removably received by at least one connecting mechanism of the pet securing device 700 or by utilizing a plurality of connecting mechanisms, wherein at least one connecting mechanism may be integrated with a top portion of each modular attachment 770 and that may be removably received by at least one internal recess within at least one of: an adjacent modular attachment 770, an adjacent weight, or the main body of the pet securing device 700.

By way of further example and not limitation, in some aspects each modular attachment 770 may comprise a shape and size substantially similar to the weights that may comprise the pet securing device 700. In some non-limiting exemplary embodiments, at least one of the modular attachments 770 may comprise at least one of: a speaker or other audio-emitting device, a light-emitting device or light source, a food or water dish, a storage container, a camera, a microphone, and a visual display screen.

For example, the pet securing device 700 may comprise a modular attachment 770 in the form of a speaker. By having a speaker attached to the pet securing device 700, a user may be able to play music to calm or entertain a pet dog.

Classical music is often used to keep dogs calm, so the user may use the speaker attached to the pet securing device 700 to play calming classical music for the dog. The user may also use the modular attachment 770 in the form of a speaker to play other desirable music while playing with the pet.

In some aspects wherein one or more of the modular attachments 770 may comprise a camera, microphone, speaker, and visual display screen, the pet securing device 700 may facilitate the ability of a user to communicate with or monitor a pet remotely. The camera and the microphone may allow the user to see and hear the pet from a remote location, while the speaker and the visual display screen may allow the pet to see and hear the user, which may be calming or pleasing for the pet while the user is away.

In some non-limiting exemplary embodiments, this remote communication may be facilitated by a software application running on a computing device, such as a smartphone, tablet, laptop computer, desktop computer, or similar computing device.

In some implementations wherein one or more of the modular attachments 770 may comprise a visual display screen, the display screen may be configured to display images or videos that a pet may find calming or pleasing, such as, by way of example and not limitation, images of an absent user or videos of other pets.

In some embodiments wherein at least one of the modular attachments 770 may comprise one or more electronic components, performance of the electronic components, such as, by way of example and not limitation, a speaker, camera, microphone, visual display screen, light-emitting element, or the like, may be controlled by at least one controller that is programmed with instructions, or code, for directing the execution or various functions that may be performed by the electronic components.

The controller may be communicatively coupled to the electronic components associated therewith either via a direct hardwired connection or via a wireless connection. In some implementations, the functionality of the controller may be at least partially directed by a user interface associated with the pet securing device 700, such as a display screen and one or more input devices (e.g., keypad, keyboard, joystick, touchscreen, or similar device) that may be physically integrated with a portion of the pet securing device 700, such as the main body, or a similar configuration of components that may be configured as a remote control device, as a non-limiting examples.

In some implementations, the pet securing device 700 may include at least one power supply for powering the controller and the associated electronic components. By way of example and not limitation, the power supply may comprise at least one of: a battery, a photovoltaic cell or element, an alternating electrical current, or a direct electrical current, as well as any combination thereof.

Figure 8:
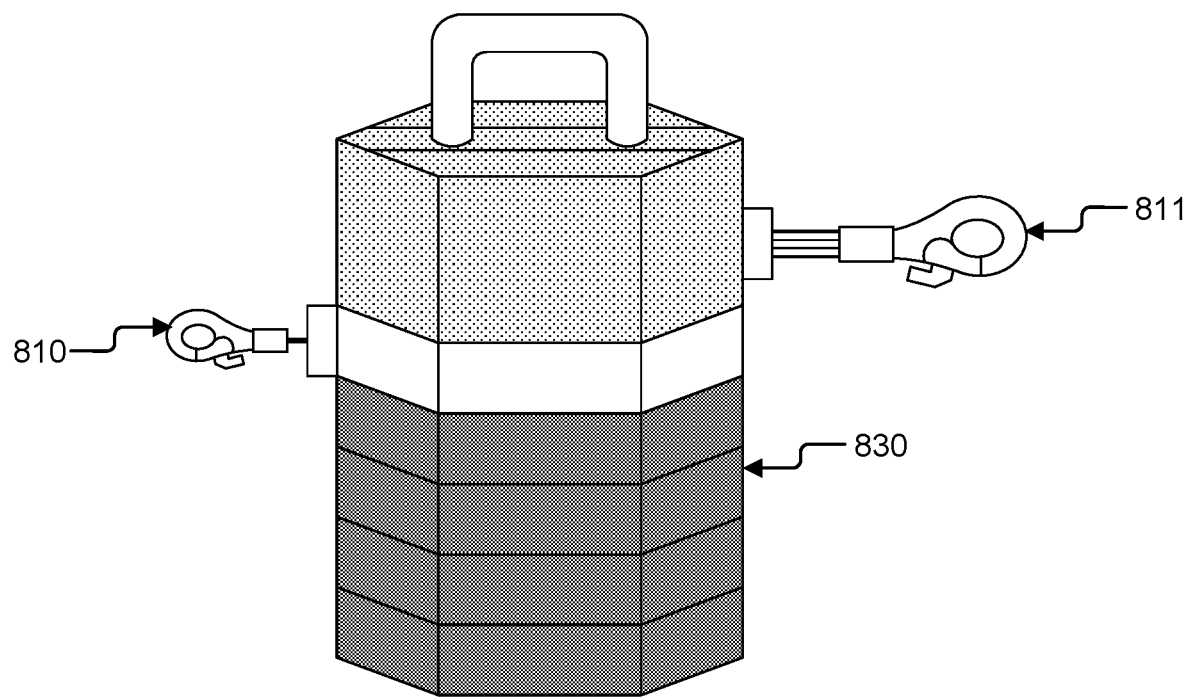
FIG. 8 illustrates an exemplary pet securing device comprising a plurality of anchors, according to some embodiments of the present disclosure.

Referring now to FIG. 8, an exemplary pet securing device 800 comprising a plurality of anchors 810, 811 is illustrated. In some implementations, the pet securing device 800 may comprise two or more anchors 810, 811. In some aspects, the pet securing device 800 may comprise one or more weights 830.

In some embodiments, the pet securing device 800 may be used to secure a pet that exceeds the securing force of the weights 830 that may be attached to the pet securing device 800. In some implementations, the pet securing device 800 may comprise a first anchor 810 that secures the pet to the pet securing device 800. In some aspects, the pet securing device 800 may comprise a second anchor 811 that secures the pet securing device 800 to a stationary surface or structure.

As an illustrative example, the pet securing device 800 may comprise weights 830 sufficient to secure a 60-pound dog. However, the user of the pet securing device 800 may wish to secure a Great Dane, which may exceed the 60-pound weight limit of the attached weights 830. For this use, a second anchor 811 may extend from the pet securing device 800 sufficient to wrap around a stationary structure, such as a metal pole that is cemented in the ground. The second anchor 811 may, by virtue of being attached to the metal pole, comprise sufficient retention force to secure the Great Dane, regardless of the Great Dane exceeding the 60-pound capacity of the pet securing device 800.

Figure 9:
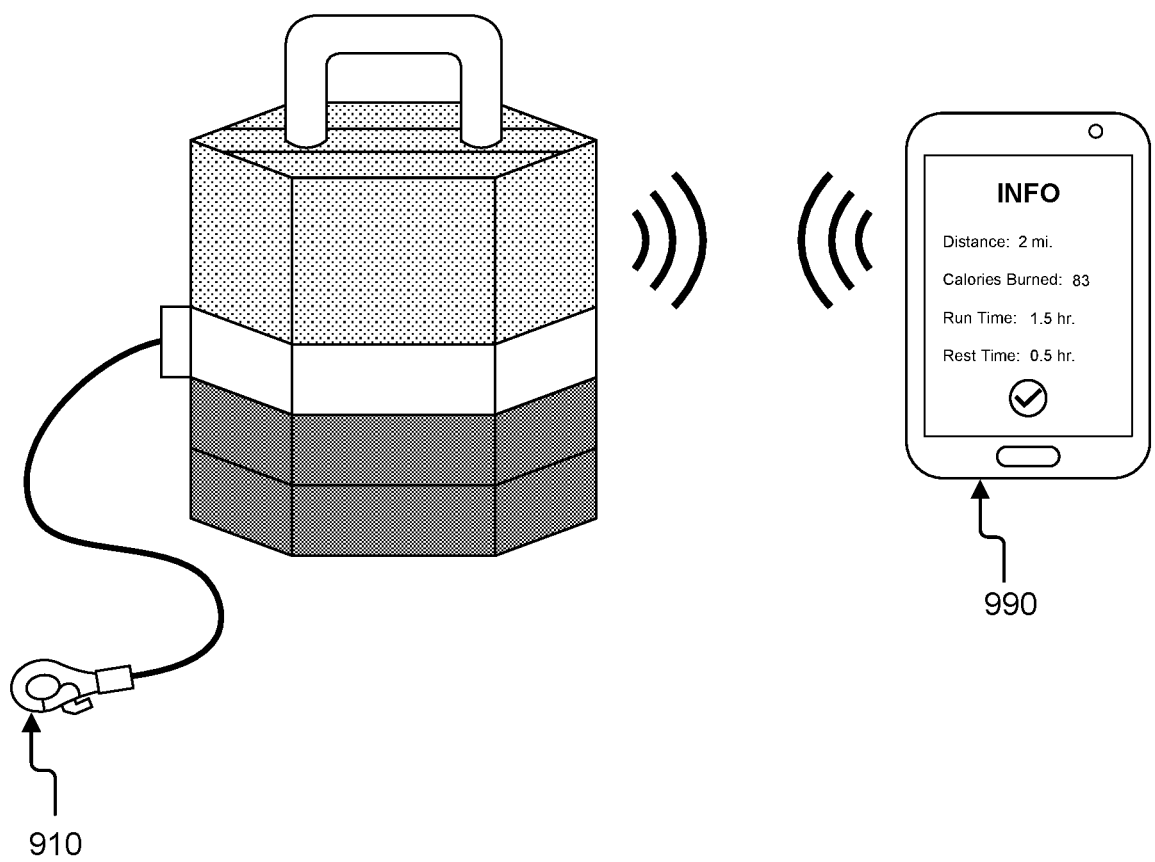
FIG. 9 illustrates an exemplary pet securing device, according to some embodiments of the present disclosure.

Referring now to FIG. 9, an exemplary pet securing device 900 is illustrated. In some embodiments, the pet securing device 900 may comprise at least one anchor 910. In some implementations, the pet securing device 900 may interface with at least one external device 990.

In some aspects, the pet securing device 900 may comprise one or more electronic components that allow various metrics or other types of information to be tracked, detected, or measured and then displayed by an external device 990 that comprises at least one visual display screen. For example, the pet securing device 900 may track the amount of distance traveled by an attached pet to report whether the pet is remaining active enough to be healthy.

By way of example and not limitation, this distance may be calculated by a controller directly or wirelessly connected to the spindle within the housing of the anchor 910 and configured to measure the direction of rotation as well as the number of rotations experienced by the spindle during a certain amount of time in order to determine how much of the cable of the anchor 910 was extended and retracted during that time, as well as how many times the extensions and retractions occurred.

Additionally, by way of further example and not limitation, the controller may be directly or wirelessly connected to one or more accelerometers, motion sensors, or similar components that may be configured to measure the rotation of the housing of the anchor 910 or the movement of the cable of the anchor 910 within a groove of the housing, where relevant, to determine how many times the pet may have traveled around the pet securing device 900.

By way of still further example and not limitation, a pet's activity level may be at least partially determined by information and data received by the external device 990 from one or more GPS (Global Positioning System) trackers that may be worn by the pet and then displayed to a user via the external device 990. In some embodiments, health analytics may be provided to the external device 990, such as heart rate and activity levels, from one or more sensors attached to or worn by the pet, such as, by way of example and not limitation, a heart rate monitor.

To further illustrate the above examples, a user may have an overweight dog, and by tracking the dog's exercise activity while attached to the pet securing device 900, the user may gain better insight into how the health of the dog may be improved.

In some implementations, the pet securing device 900 may comprise one or more sensors that provide an external device 990 with various types of environmental information that the external device 990 may then display to a user. As an example, the pet securing device 900 may comprise a temperature sensor or a sunlight sensor communicatively coupled to a controller such that the controller may be configured to send notifications to the external device 990 if the pet has been in intense heat for a long period of time. The pet securing device 900 may also comprise one or more moisture or water sensors communicatively coupled to a controller such that the controller may be configured to send a notification to the external device 990 if the pet securing device 900 begins to get wet, signifying that the pet may be stuck outside in the rain.

To further illustrate this example, a user working from home may not always be able to entertain a dog while they are on the clock. By attaching the dog to the pet securing device that comprises one or more sensors for detecting various environmental conditions and allowing the dog to roam outside, the user can have faith that the dog is safe from the elements while the external device 990 senses any environmental factors that may pose a danger to the dog.

In some aspects, the external device 990 may be configured to transmit one or more commands or instructions to the pet securing device 900 that may prompt the modification or adjustment of one or more aspects of the pet securing device 900. For example, the maximum extended length of the exposed portion of the cable of the anchor 910 may be set and adjusted remotely by the external device 990, as non-limiting examples, such as by sending a wireless signal that is received by a controller communicatively coupled to an electronically activated locking mechanism that interacts with the spindle or other portion of the anchor 910.

To further illustrate this example, a user may attach a dog to the pet securing device at a length of 15 feet. Later, when the user may be physically absent, the user may choose to increase the maximum extended length of the exposed portion of the cable to 20 feet by using the external device 990.

Figure 10:
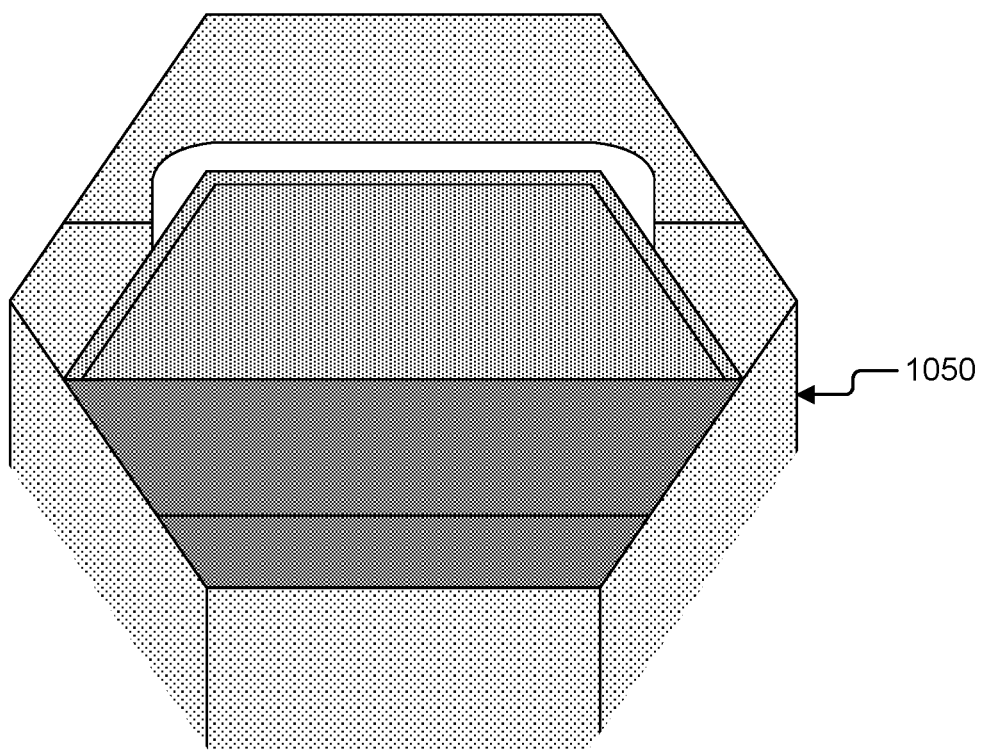
FIG. 10 illustrates an exemplary pet securing device, according to some embodiments of the present disclosure.

Referring now to FIG. 10, an exemplary pet securing device 1000 comprising at least one storage compartment 1050 is illustrated. In some embodiments, the storage compartment 1050 may comprise at least one removable component, such as a food bowl or water dish. In some implementations, the storage compartment 1050 may be integrated with the main body of the pet securing device 1000.

In some aspects, the storage compartment 1050 may be integrated with a modular attachment. In some embodiments, the storage compartment 1050 may comprise at least one lid or cover. In some implementations, the lid of the storage compartment 1050 may remain connected to the storage compartment 1050 at all times by moving about one or more hinges or similar connecting elements. In some aspects, the lid of the storage compartment 1050 may be completely removable from the storage compartment 1050.

In some implementations, the storage compartment 1050 may comprise a substantially hollow cavity within the pet securing device 1000 that allows the pet securing device to store one or more objects therein. In some embodiments, the storage compartment 1050 may comprise at least two at least partially separated portions, wherein each of the portions may be dedicated to at least one different use.

As an illustrative example, a first portion of a storage compartment 1050 may comprise a removable, empty food or water dish, while a second portion of the storage compartment 1050 may store toys and treats for a dog to play with when a user takes the dog to a park. When the dog is finished playing, the user may empty the water dish and put both the toys and the water dish back inside the storage compartment 1050 for ease of transport and storage.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A pet securing device consisting of:
   a main body having a bottom surface defining an internal recess;
   a handle affixed to an upper portion of the main body;
   one or more weights;
   an anchor system comprising:

an anchor housing defining an internal cavity, a central lumen, and a side aperture;

a spindle disposed within the internal cavity of the anchor housing, wherein the spindle is configured to rotate about a central vertical axis;

a cable having a proximal portion wrapped around the spindle and a distal portion extending radially outward through the side aperture of the anchor housing; and a pet-attachment mechanism coupled to a distal end of the cable;

an internal connecting mechanism configured to removably assemble the one or more weights, the anchor system, and the main body into a vertical stack by at least extending through the central lumen of the anchor body and into the internal recess on the bottom surface of the main body; and a locking mechanism comprising a spring-based component alterable between a locked state and an unlocked state via rotation of the locking mechanism, where the unlocked state of the locking mechanism comprises a position wherein no part of the locking mechanism physically engages the spindle or otherwise restricts movement of the cable within the housing.

2. The pet securing device of claim 1, wherein the cable is configured to extend radially outward through the side aperture of the anchor housing in response to an external pulling force applied to the pet-attachment mechanism.

3. The pet securing device of claim 1, wherein the anchor housing is rotatable about the vertical axis of the spindle.

4. The pet securing device of claim 1, wherein the side aperture of the anchor housing comprises a circumferential groove, and wherein the cable is rotatably slidable through the circumferential groove.

5. The pet securing device of claim 1, the internal connecting mechanism comprises a peg extending vertically upward from a top surface of a connecting weight of the one or more weights.

6. The pet securing device of claim 5, wherein each of the one or more weights comprises a respective peg and defines a respective bottom recess;

wherein the peg of each of the one or more weights is configured to be received within either the bottom recess of an adjacent weight of the one or more weights, or within the internal recess of the main body; and wherein the pegs of the one or more weights collectively form the internal connecting mechanism.

7. The pet securing device of claim 1, wherein the internal recess of the main body comprises a first threaded element, and wherein an outer surface of the upper portion of the internal connecting mechanism comprises a second threaded element configured to rotatably engage with the first threaded element.

8. The pet securing device of claim 1, wherein each of the one or more weights defines a surface recess and an extrusion, and wherein the surface recesses and extrusions of vertically adjacent weights are configured to be removably interconnected, thereby restricting rotational movement of the one or more weights about the vertical axis.

9. The pet securing device of claim 1, wherein the locking mechanism further consists of a rotatable dial that extends radially outward through the aperture in the anchor housing, and wherein the rotatable dial can be actuated between the locked state and the unlocked state of the locking mechanism.

10. The pet securing device of claim 1, wherein the locked state of the locking mechanism is adjustable between a plurality of locked positions, and wherein each of the plurality of locked positions limits extension of the cable to a different maximum length.

11. The pet securing device of claim 1, wherein the pet securing device is configured to wirelessly communicate with an external computing device.

12. The pet securing device of claim 11, wherein the pet securing device comprises one or more integrated sensors, and wherein the pet securing device is configured to transmit sensor data from the one or more integrated sensors to the external computing device.

13. The pet securing device of claim 11, wherein the pet securing device further comprises processing circuitry configured to:

receive a command from the external computing device; and adjust a component of the pet securing device based on the command.

* * * * *